(12) United States Patent
Sommerfeld

(10) Patent No.: US 7,216,940 B2
(45) Date of Patent: May 15, 2007

(54) ADAPTATION OF TMX FOR AXLE MOTION III TRUCK APPLICATION

(75) Inventor: Howard Sommerfeld, Oak Forest, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 10/971,875

(22) Filed: Oct. 22, 2004

(65) Prior Publication Data

US 2006/0087174 A1    Apr. 27, 2006

(51) Int. Cl.
*B60T 8/18* (2006.01)
(52) U.S. Cl. ............... 303/22.6; 303/22.7; 188/33; 188/153 R; 188/72.1; 188/72.7
(58) Field of Classification Search ........... 303/22.6, 303/22.7; 188/72.1, 72.6, 72.7, 33, 153 R, 188/196 R, 197, 71.7, 79.51, 219.1
See application file for complete search history.

(56) References Cited

U.S. PATENT DOCUMENTS

| | | | |
|---|---|---|---|
| 3,101,814 A * | 8/1963 | Newell ................. 188/203 |
| 3,637,054 A * | 1/1972 | Billeter ................. 188/195 |
| 3,893,544 A * | 7/1975 | Means .................. 188/52 |
| 4,291,789 A * | 9/1981 | Bogenschutz et al. ...... 188/351 |
| 6,241,057 B1 * | 6/2001 | Hiatt ................... 188/219.1 |
| 6,279,689 B1 * | 8/2001 | Zemyan ................ 188/33 |
| 6,279,696 B1 * | 8/2001 | Daugherty et al. ........ 188/215 |
| 6,378,668 B1 * | 4/2002 | Zemyan et al. .......... 188/170 |
| 6,761,253 B1 * | 7/2004 | Kanjo et al. ........... 188/167 |

\* cited by examiner

*Primary Examiner*—James McClellan
*Assistant Examiner*—Mariano Sy
(74) *Attorney, Agent, or Firm*—James Ray & Assoc.

(57) ABSTRACT

An apparatus engageable with a railway vehicle truck-mounted braking system for compensating for truck bolster movement which includes at least one force transmitting wedge member movable in a reciprocating motion by a pneumatic actuator. The at least one force transmitting wedge member engage rollers rotateably attached to a return push rod member disposed within the truck-mounted braking system for extending the return push rod member to reduce brake shoe clearance prior to brake shoe application. A method for compensating for truck bolster movement also includes fully pressurizing a wedge actuator prior to pressurizing the main brake apparatus actuator. Depressurization of the system returns the force transmitting wedges and return push rod to their original positions upon completion of brake application, subsequently increasing brake shoe clearance for allowable truck bolster movement.

7 Claims, 3 Drawing Sheets

ADAPTATION OF TMX FOR AXLE MOTION III TRUCK APPLICATION

FIELD OF THE INVENTION

The present invention relates, in general, to a brake apparatus for use in railway vehicle brake assemblies and, more particularly, this invention relates to a truck-mounted brake assembly using a wedge shaped auxiliary actuator for compensating truck bolster movement in a swing motion bolster truck design.

BACKGROUND OF THE INVENTION

As is generally well known in the railway industry, truck mounted braking systems comprise, in addition to the brake beams, a series of force transmitting members, levers and linkages which function to move a group of brake shoes against the wheels of a railway vehicle to effect stoppage of such railway vehicle. These force-transmitting levers are pivotally-connected to each brake beam at its midpoint, with the corresponding lever arms of these force-transfer levers being connected to the force-transmitting members.

One of the force-transmitting members includes a slack adjuster device, the other force-transmitting member includes a pneumatically actuated brake cylinder device, the body of which is mounted on one brake beam between the beam tension and compression members adjacent the strut bar, and a connecting rod between the transfer lever arm of the other brake beam and the cylinder body. The brake cylinder piston push rod is connected to the transfer lever arm of one of the brake beams. Such cylinder initiates movement of this series of force transmitting members, levers and linkages to apply the brakes of the railway vehicle mounted to a truck assembly of such railway vehicle. A well known type of truck mounted braking system is a TMX.RTM. truck mounted braking system (TMX.RTM. is a registered trademark of Westinghouse Airbrake Company, the assignee of the present invention).

The TMX was designed for the standard North American three-piece railway truck application. In this application the axle movement is limited to the gaps between the axle bearings, bearing adapters and the side frame opening. Thus, the total gap or axle movement is substantially limited and in most cases does not exceed 0.187 of an inch. Because of this limited axle movement the required brake shoe clearance is maintained allowing the TMX system to work as intended.

In addition to the standard North American three-piece railway truck design, an Axle Motion III application having a swing motion bolster design have been used to improve railway vehicle performance on a curved track as railway vehicle truck members negotiate such curved track. In Axle Motion III applications the axle centerline is allowed to move approximately ±0.75 of an inch off a nominal centerline of the axles as the truck negotiates a curve. The allowed axle movement requires a greater brake shoe clearance to eliminate brake shoe drag against the truck wheel surface. Such brake shoe drag is a non-desirable condition as it facilitates unequal wheel wear and accelerated brake shoe wear.

As it can be seen from the above discussion it is desirable to improve TMX.RTM braking system performance to allow for additional brake shoe clearance.

SUMMARY OF THE INVENTION

The present invention provides an apparatus engageable with a railway vehicle truck-mounted braking system for compensating truck bolster movement. The apparatus includes a pneumatically actuated cylinder, mounted to a fixed member of the truck-mounted braking system, having a pneumatic fluid pressure operated piston axially movable in the cylinder. Wedge members are attached to the piston for force-transmission from the piston to the return push rod, each wedge member constituting a body disposed to move axially with such piston and presenting two opposite surfaces comprising a substantially planar reaction surface disposed in a movement plane substantially parallel to the axial movement direction of the piston and a substantially planar working surface inclined from such plane parallel to the axial movement direction of the piston and oriented to provide force transmission to the return push rod in a substantially perpendicular direction. Two working rollers are rotateably attached to each side of the return push rod for registration and contact with the respective working surface of each wedge member. Two pairs of reaction rollers are rotateably attached to the main cylinder of the brake system for respective registration and contact with each of the reaction surfaces of such wedge members. A pneumatic fluid pressure communicating means is disposed intermediate a wedge actuating cylinder and a main actuating cylinder to energize the main actuating cylinder upon full travel of the wedge actuating cylinder piston.

OBJECTS OF THE INVENTION

It is an object of the present invention to provide a truck-mounted brake assembly for a railway vehicle which allows for a greater displacement of the railway vehicle truck axles during movement.

It is a further object of the invention to provide a truck-mounted brake assembly for a railway vehicle which allows for bi-directional displacement of the railway car truck axles in relationship to the center line of the railway vehicle truck.

It is another object of the invention to provide a truck-mounted brake assembly for a railway vehicle which allows for additional brake shoe clearance.

It is an additional object of the invention to provide a truck-mounted brake assembly for a railway vehicle which is easy to retrofit into existing applications.

In addition to the various objects and advantages of the present invention which have been described above, various other objects and advantages of the present invention will become more readily apparent to those persons who are skilled in the relevant art from the following more detailed description of the invention, particularly, when such description is taken in conjunction with the attached drawing figures and with the appended claims.

DETAILED DESCRIPTION OF VARIOUS EMBODIMENTS OF THE INVENTION

Figure 1:
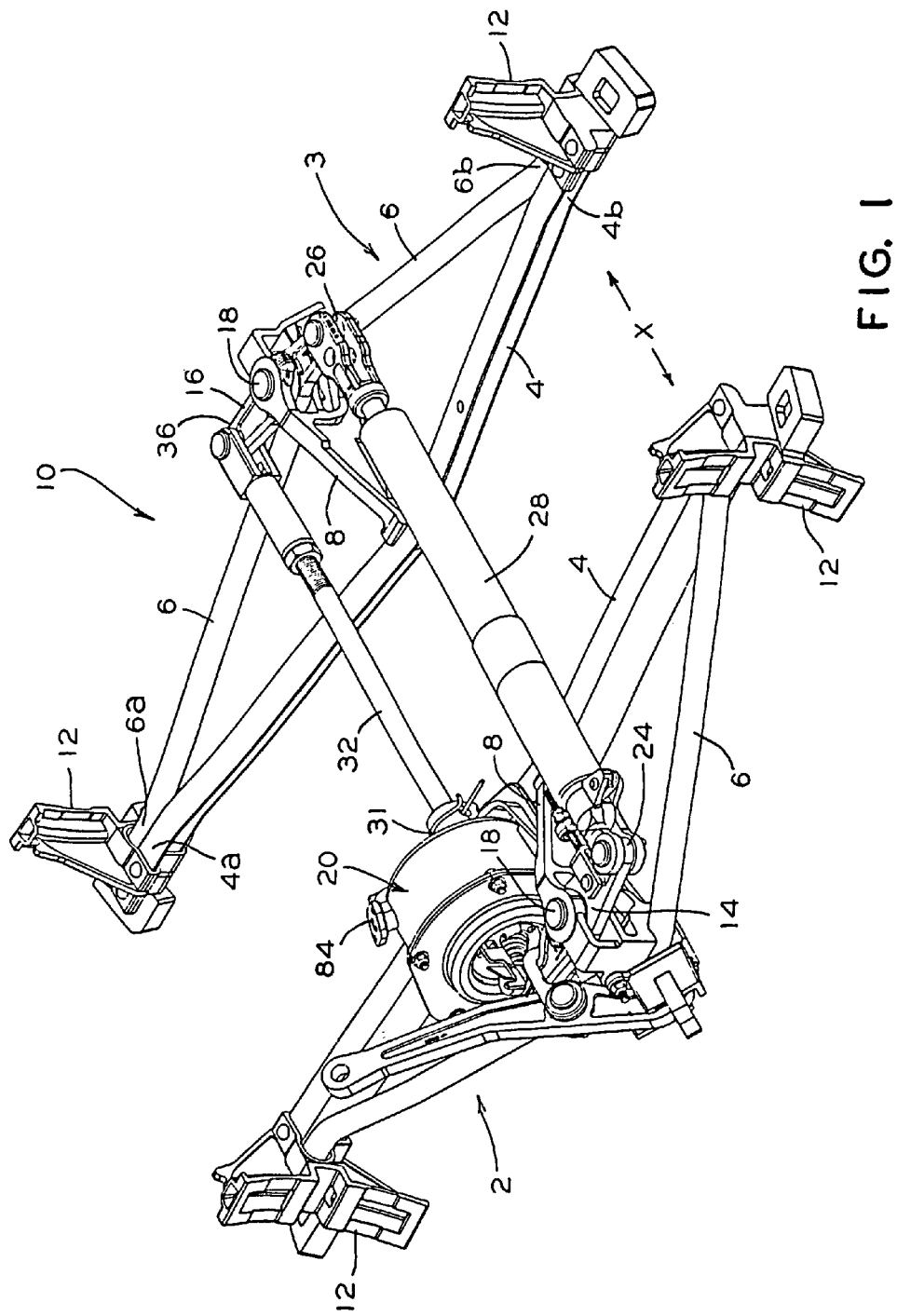
FIG. 1 is a perspective plan view of a railway vehicle truck-mounted brake arrangement.

Prior to proceeding with the more detailed description of the invention, a description of a truck mounted braking system and its functioning should provide helpful in understanding the present invention. Also, it should be noted that for the sake of clarity, identical components which have identical functions have been identified with identical reference numerals throughout the several views illustrated in the attached drawing figures.

Referring now to FIG. 1, there is shown a presently preferred embodiment of a truck-mounted brake assembly, generally designated 10, for a railway car (not shown). This brake assembly 10 comprises brake beams, generally designated 2 and 3, which are substantially identical. Each of the brake beams 2 and 3 include a compression member 4, a tension member 6 and a strut member 8. The opposite ends of the compression member 4 and the tension member 6 may be permanently connected together, such as by welding, along an outer segment 4a–6a, 4b–6b at the opposite ends of the compression member 4 and the tension member 6.

At a location substantially midway between their opposite ends, the compression member 4 and the tension member 6 of the, respective, brake beams 2 and 3 are spaced apart sufficiently to allow connection of the strut member 8 therebetween. Mounted on the respective outer end segments 4a–6a of the brake beams 2 and 3 are brake heads 12.

A pair of force-transfer levers 14 and 16 are pivotally connected by pins 18 to the strut member 8 of the respective brake beams 2 and 3. Each end 24 and 26 of the respective force-transfer levers 14 and 16 is interconnected via a force-transmitting member 28, which may be in the form of a slack adjuster device. A brake cylinder assembly, generally designated 20, is mounted on the brake beam 2 and is associated with force-transfer lever 14, as described in detail below. A connecting means 31 is provided for connecting the brake cylinder assembly 20 to a force-transmitting member or a return push rod assembly 32. This return push rod assembly 32 is secured at an opposite end with an end 36 of the force-transfer lever 16.

When a brake application is made, pressurization of the brake cylinder assembly 20 will result in actuation of an air brake cylinder piston 35, located in the brake cylinder assembly 20. This actuation of the piston 35 causes movement of a piston rod in a forward direction which causes a return urging means, such as a return spring 39, to compress. The piston rod 37 is associated with the force transfer lever 14 via a push rod such that actuation of the brake cylinder, in this manner, will result in movement of a push rod in a direction to effect a counterclockwise rotation of the force-transfer lever 14. The force transfer lever 14, in turn, causes the slack adjuster assembly 28 to effect counterclockwise rotation of the force-transfer lever 16 and consequent force acting on the return push rod assembly 32.

The force-transfer levers 14 and 16, along with the slack adjuster assembly 28, the return push rod assembly 32 and the brake cylinder assembly 20 comprise a brake beam actuating linkage that interconnects brake beams 2 and 3 via the pivot pins 18 and thus the required brake actuation forces effectively act along these pivot pins 18. The resultant of these forces is shown at X. Because the slack adjuster assembly 28 acts as a rigid member during a brake application, it is important that the length of the slack adjuster assembly 28 be allowed to increase with brake shoe wear and/or loss of a brake shoe during service so that movement of the brake cylinder piston 35 and piston rod will enable such brake beams 2 and 3 to be moved apart by the brake beams linkage until brake shoe engagement with the tread surface of the vehicle wheels occurs.

Figure 2:
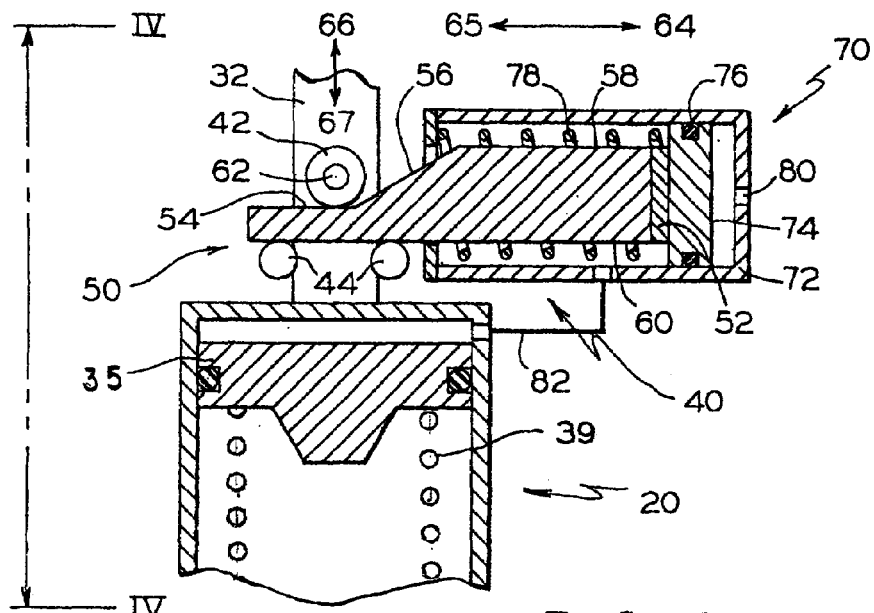
FIG. 2 is a partial plan view of a railway vehicle truck-mounted brake arrangement showing the wedge actuator of the present invention with wedge member in the original position.
Figure 3:
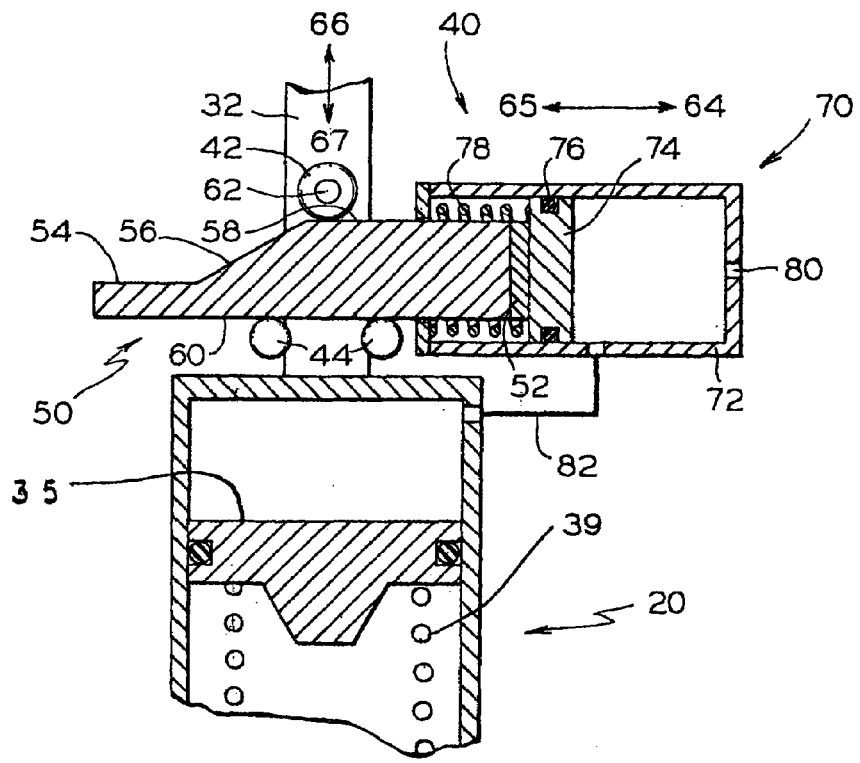
FIG. 3 is a partial plan view of a railway vehicle truck-mounted brake arrangement showing the wedge actuator of the present invention with wedge members in the extended position.
Figure 4:
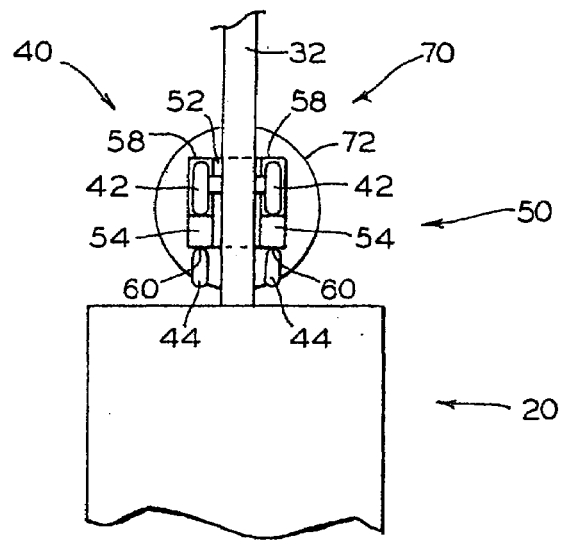
FIG. 4 is a partial plan view showing the wedge actuator of the present invention along the lines 4—4 in FIG. 2.

The disadvantage of this type of system is that it can only compensate for axle movement that does not exceed 0.187 of an inch. The present invention, as shown in FIGS. 2, 3, and 4 overcomes this disadvantage by employing a fluid pressure actuated wedge assembly, generally designated 40, which cooperates with the return push rod 32 to allow for greater axle movement. In the presently preferred embodiment such fluid pressure is pneumatic.

The wedge assembly 40 includes at least one force transmitting member, generally designated 50, reciprocating between at least one working roller 42 rotateably attached to the return push rod 32 and at least one reaction roller 44 rotateably attached to main TMX cylinder 20. In the presently preferred embodiment the at least one force transmitting member 50 includes two wedge members 50 connected together in a substantially parallel manner via a wedge connecting member 52. Furthermore, in the preferred embodiment, there are two working rollers 42 attached substantially coaxially to the return push rod 32 and four reactive rollers 44 substantially planar to such working rollers 42. The wedge assembly 40 further includes actuating means to reciprocate the wedge members 50 in the directions 64 and 65 during brake system operation.

In the presently preferred embodiment such actuating means is a pneumatic cylinder, generally designated 70, having a cylindrical casing member 72 mounted to a fixed portion of the truck-mounted braking system 10. A piston member 74 having a first surface and an opposed second surface is mounted for reciprocal movement within the cylindrical casing 72 upon the application of pneumatic pressure thereto. A seal member 76 is disposed adjacent a first end of the piston 74 and contacting the inner surface of the cylindrical casing member 72 so as to provide an airtight chamber at one end of the cylindrical member such that application of pneumatic pressure therein and against the first end of the piston 74 enables forward movement of such piston 74. A return spring 78 returns piston 74 to its initial position. The opposed second end of the piston 74 is attached to a wedge connecting member 52.

Figure 5:
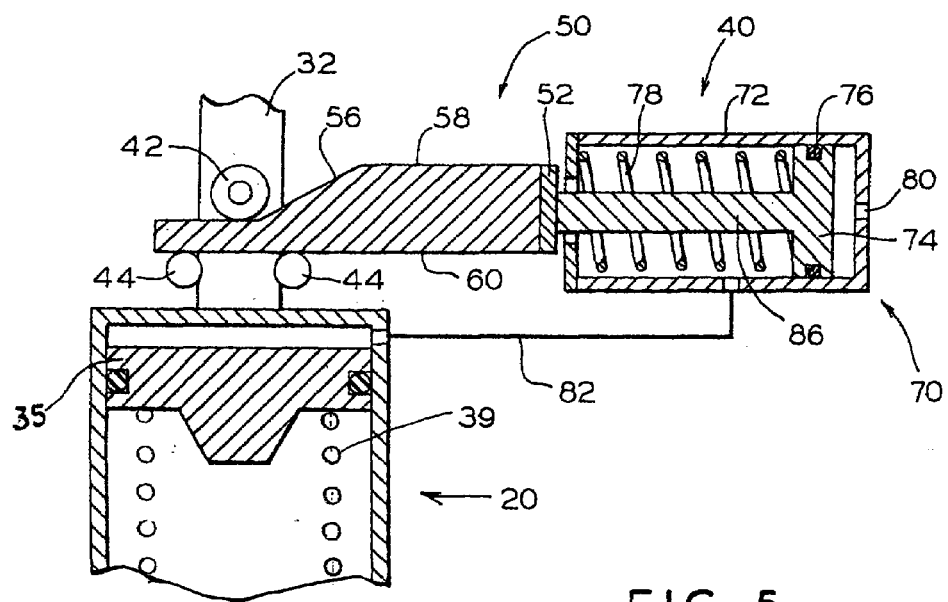
FIG. 5 is a partial plan view of a railway vehicle truck-mounted brake arrangement showing an alternative design of the wedge actuator of the present invention with wedge members in the original position.

Alternatively, the opposed end of the piston 74 may be directly connected to each wedge member 50. Furthermore, it may be desirable to have actuating means 70 substantially sealed on both ends of the piston 74 during brake application. To accomplish this, as can be seen in FIG. 5, the opposed end of the piston 74 is attached to a first end of the piston rod 86. The opposite end of the piston rod 86 is connected to a wedge connecting member 52. This piston rod 86 is capable of movement in an outward direction from the cylindrical casing 72 upon application of pneumatic pressure to initiate movement of the wedge members 50 to activate brake sequence and apply the brake shoes to the vehicle wheels.

A first pneumatic fluid pressure communications means 80 is provided on the cylindrical casing 72 to enable the application into and the evacuation of the fluid pressure from the piston cavity. The communication means 80 may be any well known means capable of supplying fluid pressure into the piston cavity. Furthermore a second pneumatic fluid pressure communication means 82 is provided on the cylindrical casing 72 to enable application into and evacuation of the fluid pressure from the main TMX cylinder 20.

As it can be seen in FIGS. 2 and 4, the first working portions 54 of wedge members 50 are engaged with the working rollers 42 rotateably attached to return push rod 32. Furthermore, the wedge reactive portions 60 of wedge members 50 are engaged with the reactive rollers 44 rotateably attached to the main TMX cylinder 20. Adjustment means are provided within working rollers 42 to compensate for alignment and mounting tolerances so as to substantially limit the drag of rollers 42 and 44 about respective wedge portions 54 and 60. In the presently preferred embodiment this adjustment means is a threaded fastener 62 having eccentric threaded and roller engageable portions.

As fluid pressure is applied to initiate a braking application it is first applied to the wedge actuating cylinder 70 entering the piston cavity through first fluid pressure communications means 80 causing the piston 74 to move outwardly in the direction 65 causing the engagement of the second wedge working portions 56 with the working rollers 42 and, more importantly, second wedge working portion 56 transmits force from the piston 74 to the return push rod 32 via such working roller 42 to enable extension movement of the return push rod 32 in the direction 65.

Furthermore, second wedge working portions 56 are angled relative to the wedge reactive portions 60 and wedge working portions 54 and 58 to allow gradual extension movement of the return push rod 32 in the direction 66 until the rollers 42 are engaged with the third wedge working portion 58, as best shown in FIG 3. The predetermined height of the second wedge working portion 56 can be varied to achieve predetermined travel of the return push rod 32. At this point, the return push rod 32 is extended to its maximum travel condition thus increasing its overall affective length, and fluid pressure is allowed to flow into the main TMX cylinder 20 through a second fluid pressure communication means 82 being exposed by the travel of piston 74. The operation of the TMX brake system 10 now proceeds as discussed above.

When the pressurization of the wedge cylinder 70 is discontinued the return spring 78 causes return movement of the piston 74 and subsequent movement of the wedge members 50 in the direction 64, the fluid pressure is released from the TMX cylinder 20 through a second fluid pressure communication means 82, and the return push rod 32 is allowed to move in a direction 67 therefore reducing its effective length and providing for additional shoe clearance in the brake system.

Further operation of the invention as a means to allow for greater and varied axle displacement will now be described for three conditions. The first condition where the distance between the axles is at nominal or during set-up (nominal brake shoe clearance), the second condition where distance between the axles is the smallest (minimum brake shoe clearance), and the third condition where the distance between the axles is the greatest (maximum brake shoe clearance).

In the first condition when the axle centerline is at nominal, the TMX brake system 10 will operate in a normal manner as discussed above. The third wedge working portion 58 is now capable of holding the total braking force during application.

In the second condition when the axle centerline is the smallest the slack adjustor 28 will shorten prior to the main TMX cylinder 20 actuation and subsequent trigger of the slack adjustor 28.

In the third condition when the axle centerline is the greatest the slack adjustor 28 will be triggered when main TMX cylinder 20 is pressurized prior to the slack adjustor 28 triggering causing such slack adjustor 28 to lengthen.

Currently used brake cylinder assemblies may be retrofitted with the wedge actuator assembly of the present invention by modifying a return push rod and main cylinder casing to respectively mount working rollers, reactive rollers and the wedge actuator assembly. Furthermore, additional set-up adjustments of the truck-mounted brake assembly may be made to incorporate features of the present invention.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus engageable with a railway vehicle truck-mounted braking system for compensating for truck bolster movement, said apparatus comprising:
    (a) a first actuating means mounted to a fixed member of said truck-mounted braking system, said first actuating means including;
        (i) a cylindrical casing attached to said fixed member of said truck-mounted brake system,
        (ii) a pneumatic fluid pressure operated piston axially movable in said cylindrical casing; casing
        (iii) a first fluid pressure communicating means disposed adjacent one end of said cylindrical casing for receiving pneumatic pressure, and
        (iv) a second fluid pressure communicating means for supplying fluid pressure from said cylindrical casing to a main cylinder upon complete travel of said piston
    (b) a force transmitting means includes a wedge member attached to said first actuating means for reciprocal motion thereof and for transmitting force generated by said first actuating means onto linkage disposed within said truck-mounted braking system;
    (c) a force receiving means disposed within said linkage; and
    (d) a fluid pressure communication means disposed between said first actuating means and a second actuating means disposed within said truck-mounted braking system.

2. An apparatus engageable with a railway vehicle truck-mounted braking system for compensating for truck bolster movement according to claim 1, wherein said apparatus includes two wedge members, each wedge member constituting a body disposed to move axially with said piston and presenting two opposite surfaces having a substantially planar reaction surface disposed in a movement plane substantially parallel to an axial movement direction of said piston and a substantially planar working surface inclined from said plane parallel to said axial force transmission to said return push rod in said substantially perpendicular direction.

3. An apparatus engageable with a railway vehicle truck-mounted braking system for compensating for truck bolster movement according to claim 1, wherein said force receiving means includes:
   (a) at least one working roller rotateably attached to said return push rod for registration and contact with a respective working surface of each said wedge member;
   (b) at least one reaction roller rotateably attached to said main cylinder of said brake system for respective registration and contact with each of said working surfaces of said wedge members; and
   (c) adjustment means disposed within said working rollers to compensate for manufacturing and installation tolerances related to a pneumatic wedge actuator.

4. An apparatus engageable with a railway vehicle truck-mounted braking system for compensating for truck bolster movement according to claim 3, wherein said apparatus includes two working rollers each attached to each side of said return surface of each said wedge member.

5. An apparatus engageable with a railway vehicle truck-mounted braking system for compensating for truck bolster movement according to claim 3, wherein said at least one working roller has an adjustment means to substantially minimize friction forces upon contact with each of said working surfaces of said wedge members.

6. An apparatus engageable with a railway vehicle truck-mounted braking system for compensating said truck bolster movement according to claim 3, wherein said apparatus includes two pair of reaction rollers rotateably attached to said main cylinder of said brake system for respective registration and contact with each reaction surface of said wedge members.

7. A method of accommodating movable bolster truck design, said method comprising the steps of:
   (a) applying fluid pressure first to a wedge actuator causing outward movement of an actuator piston;
   (b) urging extension of a return push rod to achieve its maximum effective length by engagement of angled portions of wedge members with working rollers, rotateably mounted to said return push rod, thereby transmitting a generated piston force thereto;
   (c) applying fluid pressure next to a main cylinder disposed within truck-mounted brake assembly by exposing a fluid pressure communication means upon completed travel of said actuator piston;
   (d) completing normal brake application cycle by energizing said main cylinder and rotating linkage to engage brake shoes with wheel surfaces;
   (e) removing fluid pressure from said wedge actuator to disengage brake shoes; and
   (f) achieving reverse movement of said return push rod to provide additional brake shoe clearance by evacuating air from said main cylinder into atmosphere and spring returning said actuator piston to its original position, therefore allowing said return push rod to return to its original position.

\* \* \* \* \*